Patented June 1, 1954

2,680,071

UNITED STATES PATENT OFFICE 2,680,071

LOW-MELTING ALLOY

Leo F. Epstein, Schenectady, William H. Howland, Waterford, and Marion D. Powers, Schenectady, N. Y., assignors, by mesne assignments, to the United States of America as represented by the United States Atomic Energy Commission No Drawing. Application August 20, 1951, Serial No. 242,786

2 Claims. (Cl. 75—134)

This invention relates to a ternary low melting alloy which is a good thermal neutron absorber. Such an alloy may find use as a control medium for a nuclear reactor, where it is required that the alloy have a melting point below 100° C.

We have found that an alloy composed of the elements indium, cadmium, and bismuth has an extremely low melting point for a ternary mixture of metals and also meets the above requirement as to absorption of thermal neutrons. Our improved alloy, which has a melting point of around 61.5° C., is of the following composition:

| Metal: | Percent by weight |
|---|---|
| Indium | 54 to 62 |
| Cadmium | 8 to 18 |
| Bismuth | Balance |

We have found that the eutectic, which melts at 61.47±0.05° C., has a composition of 61.6% indium, 8.3% cadmium, and balance bismuth.

Our alloy may be prepared by melting and thoroughly mixing the constituents in a crucible of graphite or other suitable material.

In addition to the use pointed out above, our alloy also lends itself to the following uses: heat transfer fluid; heat treating baths; dental alloy; bearings; solders; bending pipe and tubing; casting alloy; thermometric liquid; fusible alloy for sprinklers and fire prevention systems and fuses.

What we claim as our invention is:

1. A new neutron absorbing ternary alloy consisting of about 54 to 62% by weight of indium, about 8 to 18% by weight of cadmium and the remainder bismuth.

2. A new neutron absorbing ternary alloy consisting essentially of 8.3% by weight of cadmium, 30.0% by weight of bismuth and 61.6% by weight of indium.

References Cited in the file of this patent

Industrial and Engineering Chemistry, vol. 27 (1935); pages 1464 and 1465.

American Institute of Mining and Metallurgical Engineers, vol. 171 (1947); pages 389–395.

Transactions of Amer. Soc. for Metals, vol. 41 (1949); pp. 947–960.

Transactions of Amer. Soc. for Metals, vol. 43 (1951); pp. 853–872.